United States Patent
Nagatani

(10) Patent No.: US 9,389,496 B2
(45) Date of Patent: Jul. 12, 2016

(54) PROJECTOR WITH COOLING UNIT

(71) Applicant: SEIKO EPSON CORPORATION, Tokyo (JP)

(72) Inventor: Kaname Nagatani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 210 days.

(21) Appl. No.: 14/077,870

(22) Filed: Nov. 12, 2013

(65) Prior Publication Data

US 2014/0139812 A1 May 22, 2014

(30) Foreign Application Priority Data

Nov. 19, 2012 (JP) .................................. 2012-252965
Nov. 19, 2012 (JP) .................................. 2012-252966

(51) Int. Cl.
*G03B 21/20* (2006.01)
*G03B 21/16* (2006.01)
*H04N 9/31* (2006.01)
*G03B 21/14* (2006.01)
*G03B 33/06* (2006.01)
*F21V 29/00* (2015.01)

(52) U.S. Cl.
CPC .............. *G03B 21/16* (2013.01); *G03B 21/145* (2013.01); *G03B 21/2013* (2013.01); *G03B 33/06* (2013.01); *H04N 9/3144* (2013.01); *F21V 29/40* (2013.01); *F21V 29/402* (2013.01); *G03B 21/20* (2013.01); *G03B 21/2006* (2013.01); *G03B 21/208* (2013.01); *G03B 21/2033* (2013.01); *G03B 21/2093* (2013.01)

(58) Field of Classification Search
CPC .... G03B 21/16; G03B 21/20; G03B 21/2006; G03B 21/2013; G03B 21/2033; G03B 21/208; G03B 21/2093; H04N 9/3144; F21V 29/40; F21V 29/402

See application file for complete search history.

(56) References Cited

U.S. PATENT DOCUMENTS

| | | | |
|---|---|---|---|
| 7,795,822 B2 * | 9/2010 | Arai et al. ..................... | 315/309 |
| 8,622,591 B1 * | 1/2014 | Liu .......................... | F21V 29/40 |
| | | | 362/249.02 |
| 2005/0007788 A1 | 1/2005 | Katayama et al. | |
| 2005/0036116 A1 | 2/2005 | Yajima et al. | |
| 2008/0042578 A1 * | 2/2008 | Arai et al. ....................... | 315/32 |
| 2009/0296387 A1 * | 12/2009 | Reisenauer et al. .......... | 362/235 |

FOREIGN PATENT DOCUMENTS

| | | |
|---|---|---|
| JP | A-2000-35614 | 2/2000 |
| JP | A-2004-126381 | 4/2004 |
| JP | A-2005-31106 | 2/2005 |

(Continued)

OTHER PUBLICATIONS

Translation of JP 2006227143 A.*

*Primary Examiner* — Bao-Luan Le
(74) *Attorney, Agent, or Firm* — Oliff PLC

(57) ABSTRACT

A projector includes an optical engine unit including a light source unit configured to emit light, a light modulating unit configured to modulate, according to image information, the light emitted from the light source unit, and a projecting unit configured to project the light modulated by the light modulating unit, a connecting unit connectable to a bulb socket, a power supply unit configured to supply electric power received from the connecting unit to the optical engine unit, and a cooling unit arranged between the connecting unit and the optical engine unit and configured to circulate the air to cool the power supply unit and the optical engine unit.

13 Claims, 10 Drawing Sheets

(56) References Cited

FOREIGN PATENT DOCUMENTS

| JP | A-2005-31549 | 2/2005 |
| JP | A-2006-227143 | 8/2006 |
| JP | A-2008-298998 | 12/2008 |

* cited by examiner

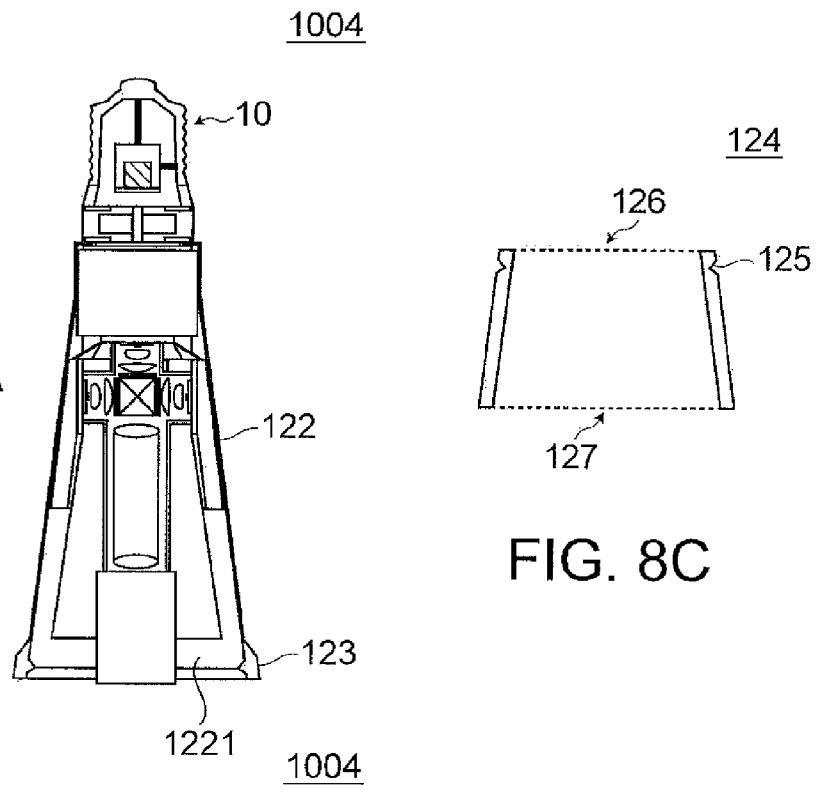
FIG. 8A
FIG. 8B
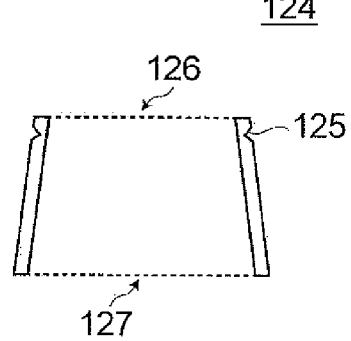
FIG. 8C
FIG. 8D

PROJECTOR WITH COOLING UNIT

BACKGROUND

1. Technical Field

The present invention relates to a projector.

2. Related Art

There has been widely known a projector including a cooling unit configured to circulate the air to cool an internal mechanism (see, for example, JP-A-2005-31106). In the projector in the past, it is possible to cool, with the cooling unit, the internal structure (e.g., a power supply unit and an optical engine unit) of the projector.

However, the widely-known projector in the past is a general projector that uses electric power from a battery, a socket, or the like. Naturally, there are known the configuration and the arrangement of the cooling unit corresponding to the projector. Therefore, concerning a projector that uses electric power supplied from a bulb socket, i.e., a projector connected to the bulb socket and used, the projector including the cooling unit and the configuration and the arrangement of the cooling unit are not known. Concerning the projector connected to the bulb socket and used, a reduction in size of the projector is strongly demanded because of characteristics thereof. Therefore, it is difficult to directly use the configuration and the arrangement of the cooling unit known in the past.

SUMMARY

An advantage of some aspects of the invention is to solve at least a part of the problems described above, and the invention can be implemented as the following forms.

An aspect of the invention is directed to a projector including: an optical engine unit including a light source unit configured to emit light, a light modulating unit configured to modulate, according to image information, the light emitted from the light source unit, and a projecting unit configured to project the light modulated by the light modulating unit; a connecting unit connectable to a bulb socket; a power supply unit configured to supply electric power received from the connecting unit to the optical engine unit; and a cooling unit arranged between the connecting unit and the optical engine unit and configured to circulate the air to cool the power supply unit and the optical engine unit.

The "bulb socket" refers to a socket in general for attaching a bulb. As such a bulb socket, there is widely known a bulb socket in which a thread is formed on an inner side surface and the inner side surface and an inner bottom surface are formed as electrodes (a so-called screw-type bulb socket). However, the projector according to the invention can be widely applied not only to the screw-type bulb socket but also to other types of bulb sockets (e.g., a hook-type bulb socket) by using connecting units corresponding to the bulb sockets.

The projector having the configuration includes the connecting unit connectable to the bulb socket. Therefore, it is possible to easily attach and use the projector in any place where the bulb socket is set.

The projector includes the cooling unit arranged between the connecting unit and the optical engine unit and configured to circulate the air to cool the power supply unit and the optical engine unit. Therefore, it is possible to configure a compact cooling route and contribute to a reduction in size of the projector.

Further, it is possible to cool, with one cooling unit, main components to be heated such as the power supply unit and the optical engine unit and the other components in the projector. Therefore, it is possible to reduce costs of the projector.

It is preferable that, in the projector according to the aspect, at least a part of the power supply unit is arranged on the inside of the connecting unit.

With this configuration, the cooling unit is arranged between the connecting unit and the optical engine unit and at least a part of the power supply unit is arranged on the inside of the connecting unit. Therefore, it is possible to easily cool the optical engine unit and the power supply unit with the cooling unit.

It is preferable that, in the projector according to the aspect, the connecting unit and the optical engine unit are respectively arranged in positions opposed across the cooling unit.

With this configuration, it is possible to circulate, using a cooling unit having a simple configuration, e.g., a fan of an axial flow type, the air from the optical engine unit side to the connecting unit side or from the connecting unit side to the optical engine unit side and cool the optical engine unit and the power supply unit in the connecting unit.

It is preferable that, in the projector according to the aspect, the cooling unit forms a flow of the air from the optical engine unit side to the connecting unit side.

With this configuration, it is possible to first cool the light source unit and the light modulating unit, for which necessity of cooling is high from the viewpoint of a heat value and a heat resistant temperature, and secure operation stability of the projector.

By adopting the configuration explained above, it is possible to form a flow of the air from a side where the projector projects an image to the side of the bulb socket. Therefore, it is possible to suppress a projected image from being swayed by the warmed air.

It is preferable that, in the projector according to the aspect, the optical engine unit includes, on a side other than a side where the projecting unit projects light, a heat radiating unit configured to radiate heat emitted from the light source unit.

With this configuration, the optical engine unit includes the heat radiating unit configured to radiate the heat emitted from the light source unit. Therefore, it is possible to efficiently cool the light source unit and greatly reduce heat conducted from the light source unit to the other components (e.g., the light modulating unit).

It is preferable that, in the projector according to the aspect, the optical engine unit includes a plurality of the light source units and a plurality of the heat radiating units individually corresponding to the plurality of light source units.

By adopting such a configuration, if different color light is emitted from each of the light source units, it is possible to project a multicolor projected image without separating light emitted from one light source unit, which emits white light, into a plurality of color lights. Further, a configuration for separating color light into a plurality of color lights is unnecessary. Therefore, it is possible to contribute to a reduction in size of the projector.

Since the plurality of heat radiating units are provided to individually correspond to the plurality of light source units, it is possible to efficiently cool the light source unit.

It is preferable that the plurality of heat radiating units are arranged not to conduct heat to one another. By adopting such a configuration, it is possible to suppress conduction of heat among the heat radiating units and perform cooling suitable for the respective light source units, for example, associate a large heat radiating unit with the light source unit having a large heat value or a low heat resistant temperature and associate a small heat radiating unit with the light source unit having a small heat value or a high heat resistant temperature.

It is preferable that, in the projector according to the aspect, the plurality of light source units are first to third light source units, the optical engine unit includes a light combining unit configured to combine lights emitted from the first to third light source units and emit combined light, the first light source unit is arranged in a direction opposite to a projecting direction, in which the projecting unit projects light, with respect to the light combining unit, the second and third light source units are arranged in a direction substantially orthogonal to the projecting direction with respect to the light combining unit, the heat radiating unit corresponding to the first light source unit is arranged between the first light source unit and the cooling unit, and the heat radiating units corresponding to the second and third light source units are arranged in directions substantially orthogonal to the projecting direction with respect to the second and third light source units.

By adopting such a configuration, in the projector including the three light source units, it is possible to arrange the heat radiating units in appropriate positions and efficiently cool the light source units.

It is preferable that, in the projector according to the aspect, the connecting unit is connectable to a screw-type bulb socket.

By adopting such a configuration, it is possible to connect the projector to a widely-used screw-type bulb socket and use the projector.

It is preferable that the projector according to the aspect further includes: a communication port configured to communicate the outside and the inside of the projector; and a cover including an opening section at an end on the projecting direction side where the projecting unit projects light and configured to cover at least a part of the optical engine unit, and the cooling unit leads in the air outside the projector from one of the communication port and the opening section and leads the led-in air to the other.

With this configuration, the projector includes the communication port configured to communicate the outside and the inside of the projector and the opening section provided at the end on the projecting direction side. Consequently, it is possible to lead in the air outside the projector from one of the communication port and the opening section, circulate the air between the optical engine unit and the cover, and discharge the air to the outside of the projector from the other of the communication port and the opening section. Therefore, it is possible to efficiently cool the optical engine unit and the power supply unit with the air led in from the outside of the projector.

It is preferable that, in the projector according to the aspect, the communication port is arranged on the opposite side of the optical engine unit with respect to the cooling unit.

With this configuration, since the position of the communication port is located in the position explained above, it is possible to suppress the air warmed by cooling the power supply unit and the optical engine unit from being circulated to the power supply unit and the optical engine unit again. Therefore, further, it is possible to efficiently cool the optical engine unit and the power supply unit.

It is preferable that, in the projector according to the aspect, the cooling unit leads in the air from the opening section and leads the led-in air to the communication port.

With this configuration, it is possible to form a flow of the air from the side where the projector projects an image to the side of the connecting unit. Therefore, it is possible to suppress a projected image from being swayed by the warmed air and secure satisfactory image quality.

By adopting the configuration explained above, a flow of the air from the optical engine unit side to the connecting unit side is formed. Therefore, it is possible to first cool the light source unit and the light modulating unit, for which necessity of cooling is high from the viewpoint of a heat value and a heat resistant temperature, and secure operation stability of the projector.

It is preferable that, in the projector according to the aspects, the connecting unit and the optical engine unit are respectively arranged in positions opposed across the cooling unit, and a sectional shape of the cover on a plane orthogonal to the projecting direction is a sectional shape in which an opening area decreases from the opening section side toward the cooling unit side.

With this configuration, the connecting unit and the optical engine unit are arranged in the positions opposed across the cooling unit. Therefore, it is possible to circulate, using a cooling unit having a simple configuration, e.g., a fan of an axial flow type, the air from the optical engine unit side to the connecting unit side or from the connecting unit side to the optical engine unit side and cool the optical engine unit and the power supply unit in the connecting unit.

Since the cover has the shape explained above, the flow velocity of the air led in from the opening section increases toward the cooling unit. Consequently, it is possible to further improve the cooling efficiency for the power supply unit in the connecting unit.

It is preferable that, in the projector according to the aspect, the optical engine unit includes, on a side other than a side where the projecting unit projects light, a heat radiating unit configured to radiate heat emitted from the light source unit, and the cover covers the heat radiating unit and extends in the projecting direction.

With this configuration, the optical engine unit includes the heat radiating unit configured to radiate the heat emitted from the light source unit and the cover is formed as explained above. Therefore, it is possible to efficiently cool the light source unit with the air led in from the opening section or the communication port and greatly reduce heat conducted from the light source unit to the other components (e.g., the light modulating unit).

It is preferable that, in the projector according to the aspect, the optical engine unit includes, on a side other than a side where the projecting unit projects light, a heat radiating unit configured to radiate heat emitted from the light source unit, and the cover covers the heat radiating unit and at least a part of the projecting unit and extends in the projecting direction.

With this configuration, the cover covers at least a part of the projecting unit and the heat radiating unit and extends in the projecting direction. Consequently, the inside of the projector is cooled and the warmed air discharged from one of the communication port and the opening section is suppressed from being led into the other. Therefore, it is possible to surely cool the components inside the projector such as the optical engine unit and the power supply unit.

It is preferable that the cover extends in the projecting direction to cover the cooling unit to the distal end of the optical engine unit.

In a configuration in which a socket cover equivalent to a shade of a luminaire is provided in the bulb socket, the warmed air discharged from the projector is likely to be held up in the socket cover. Therefore, it is preferable that the end on the projecting direction side of the cover extends in the projecting direction to be located further on the projecting direction side than the end on the projecting direction side of the socket cover.

It is preferable that the projector according to the aspect further includes an extension member extending from an end on the opening section side of the cover in the projecting direction and detachably attached to the end.

With this configuration, the projector has amounted state in which the extension member is attached to the cover and an unmounted state in which the extension member is not attached to the cover. Consequently, it is possible to adjust the projector to an environment of use (e.g., the size of the socket cover) and select, as an interior or the like, the projector in more suitable one of the mounted state and the unmounted state according to a taste of a user. Therefore, it is possible to perform efficient cooling and improvement of the appearance of the projector.

Examples of a method detachably attaching the extension member to the cover include a method of fitting the extension member in the cover using concaves and convexes and a method of screwing the extension member into the cover using a thread.

It is preferable that the projector according to the aspect further includes a dustproof filter arranged at least in an area of the opening section of the cover where the light projected from the projecting unit is not blocked.

With this configuration, it is possible to suppress dust and the like from intruding into the projector and suppress deterioration in an image projected by the projector.

Another aspect of the invention is directed to a projector including: an optical engine unit including a light source unit configured to emit light, a light modulating unit configured to modulate, according to image information, the light emitted from the light source unit, and a projecting unit configured to project the light modulated by the light modulating unit; a connecting unit connectable to a bulb socket; a power supply unit configured to supply electric power received from the connecting unit to the optical engine unit; a cooling unit arranged between the connecting unit and the optical engine unit and configured to circulate the air to cool the power supply unit and the optical engine unit; a cover including an opening section at an end on a projecting direction side where the projecting unit projects light and configured to cover at least a part of the optical engine unit; and a projector cover including an opening section at an end on the projecting direction side and configured to cover at least a part of the cover. The projector cover has a shape in which the end on the projecting direction side is located further on the connecting unit side than the end on the projecting direction side of the cover.

With this configuration, the projector includes the projector cover configured to cover the cover. Therefore, a channel through which the air, which has cooled the inside of the cover, circulates is formed between the cover and the projector cover.

The projector cover has the shape in which the end on the projecting direction side is located further on the connecting unit side than the end on the projecting direction side of the cover. Therefore, the warmed air discharged from the opening section of the projector cover is suppressed from being led into the opening section of the cover. Therefore, it is possible to further improve cooling efficiency for the projector.

Since the projector includes the projector cover, it is more likely that the projector is observed as an interior by a user. Therefore, even when the projector is attached to a bulb socket not provided with a socket cover, it is possible to improve the appearance characteristics of the projector.

BRIEF DESCRIPTION OF THE DRAWINGS

The invention will be described with reference to the accompanying drawings, wherein like numbers reference like elements.

FIG. 8A is a schematic diagram for explaining a projector according to a third embodiment and is a sectional view of a state in which an extension member is not attached to the projector.

FIG. 8B is a sectional view of a projector in a state in which the extension member is attached in the third embodiment.

FIG. 8C is a sectional view of the extension member in the third embodiment.

FIG. 8D is a perspective view of the extension member in the third embodiment.

DESCRIPTION OF EXEMPLARY EMBODIMENTS

First Embodiment

Figure 1C:
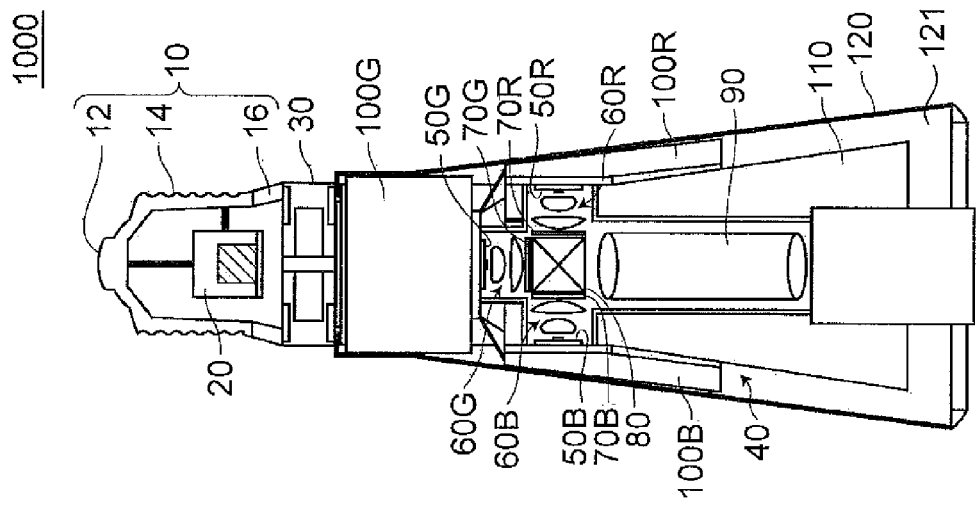
FIG. 1C is a sectional view of the projector according to the first embodiment.
Figure 1B:
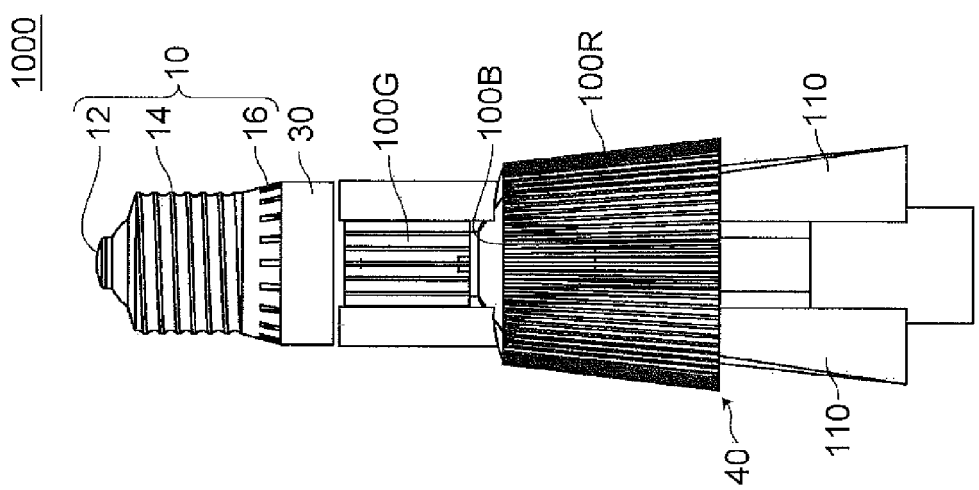
FIG. 1B is a diagram of a state in which a cover of the projector according to the first embodiment is removed.
Figure 1A:
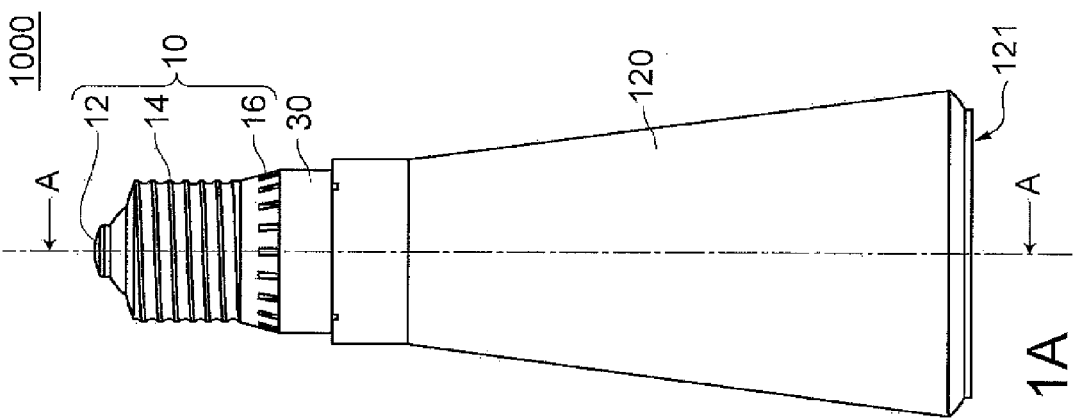
FIG. 1A is a front view of a projector according to a first embodiment.

FIGS. 1A to 1C are schematic diagrams for explaining a projector 1000 according to a first embodiment. Specifically, FIG. 1A is a front view of the projector 1000. FIG. 1B is a front view of the projector 1000 in a state in which a cover 120 included in the projector 1000 is removed. FIG. 1C is an A-A sectional view of FIG. 1A.

The projector 1000 includes, as shown in FIGS. 1A to 1C, a connecting unit 10, a power supply unit 20, a cooling unit 30, an optical engine unit 40, and the cover 120.

The connecting unit 10 is configured to be connectable to a bulb socket to which electric power is supplied from the outside. Further, the connecting unit 10 includes a first contact portion 12 located in a distal end portion and a second contact portion 14 on which a spiral thread (a right-hand thread) is formed. The connecting unit 10 in this embodiment corresponds to a screw-type bulb socket specified by a model number E26 standardized by the TEC (International Electrotechnical Commission). The connecting unit 10 is not limited to the bulb socket specified by the model number E26 and may be configured to correspond to various bulb sockets such as a screw-type bulb socket of a model other than the model number E26 and a hook-type bulb socket.

The connecting unit 10 includes a cylindrical section in the second contact portion 14 on the opposite side of the first contact portion 12. A plurality of communication ports 16 configured to communicate the outside and the inside of the projector 1000 are formed around the cylindrical section. The communication ports 16 function as discharge ports through which the air inside the projector 1000 is discharged to the outside.

The power supply unit 20 includes a filter circuit. The power supply unit 20 supplies an electric current, which is fed from the bulb socket via the connecting unit 10, to below-mentioned light source units 50R, 50G, and 50B, the cooling unit 30, and the like as electric power for driving the projector 1000. Such a configuration of the power supply unit 20 as a whole is widely known. Therefore, detailed explanation of the configuration is omitted. As shown in FIG. 1C, at least a part of the power supply unit 20 is arranged in the connecting unit 10. In the projector 1000 according to this embodiment, a part of the filter circuit and the like of the power supply unit 20 is arranged in the connecting unit 10. The other portions (not shown in the figure) of the power supply unit 20 are arranged near a below-mentioned circuit board 110.

The cooling unit 30 includes, for example, a fan of an axial flow type. The cooling unit 30 is arranged between the connecting unit 10 and the optical engine unit 40. The cooling unit 30 circulates the air in the cover 120 according to driving of the fan to cool the power supply unit 20 arranged in the connecting unit 10, the optical engine unit 40, and the other components in the cover 120. The connecting unit 10 and the optical engine unit 40 are respectively arranged in positions opposed across the cooling unit 30.

The optical engine unit 40 includes, as shown in FIG. 1C, light source units 50R, 50G, and 50B, light collimating optical systems 60R, 60G, and 60B, light modulating units 70R, 70G, and 70B, a cross dichroic prism 80 functioning as a light combining unit, a projecting unit 90, heat radiating units 100R, 100G, and 100B, and a circuit board 110.

The light source unit 50R includes a light emitting unit 52R (the sign is not shown in the figure) and emits red light. The light source unit 50G includes a light emitting unit 52G (the sign is not shown in the figure) and emits green light. The light source unit 50B includes a light emitting unit 52B (the sign is not shown in the figure) and emits blue light.

The light source unit 50G is equivalent to the first light source unit and arranged in a direction opposite to a projecting direction, in which the projecting unit 90 projects light, with respect to the cross dichroic prism 80.

The light source unit 50R is equivalent to the second light source unit. The light source unit 50B is equivalent to the third light source unit. The light source units 50R and 502 are arranged in a direction substantially orthogonal to the projecting direction with respect to the cross dichroic prism 80.

Examples of the light emitting units 52R, 52G, and 52B included in the light source units 50R, 50G, and 50B include light emitting diodes (LED), semiconductor laser diodes (LDs), and organic EL diodes (OLEDs).

The light collimating optical systems 60R, 60G, and 60B change lights emitted from the light source units 50R, 50G, and 50B corresponding thereto into substantially parallel lights. The projector 1000 can be configured to further include light equalizing optical systems (integrator optical systems) configured to equalize the lights emitted from the light source units 50R, 50G, and 50B. When the lights emitted by the light source units 50R, 50G, and 50B are parallel lights, the light collimating optical systems do not have to be used.

The light modulating units 70R, 70G, and 70B respectively modulate, according to image information, the lights emitted from the light source units 50R, 50G, and 50B corresponding thereto. The light modulating units 70R, 70G, and 70B are light modulating devices of a liquid crystal type in which liquid crystal, which is an electro-optic substance, is sealed and encapsulated between pairs of transparent glass substrates and are light modulating devices of a transmission type configured to modulate lights emitted from the light source units 50R, 50G, and 50B according to image information. The light modulating units 70R, 70G, and 70B modulate, for example, using polysilicon TFTs as switching elements, directions of polarization of lights according to given image information. Although not shown in the figure, in the front and back of the light modulating units 70R, 70G, and 70B with respect to traveling directions of the lights emitted from the light source units 50R, 50G, and 50B, incident side polarizing plates and emission side polarizing plates are arranged. Light modulation of incident color lights is performed by the incident side polarizing plates, the light modulating units, and the emission side polarizing plates.

The cross dichroic prism 80 is a light combining unit configured to combine the lights received from the three light source units 50R, 50G, and 503 and emit combined light. Further, the cross dichroic prism 80 is an optical element configured to combine optical images modulated for each of color lights by the light modulating units 70R, 70G, and 70B and form a color image. The cross dichroic prism 80 is formed in a substantially square shape in plan view obtained by sticking together four rectangular prisms. Dielectric multilayer films are formed on interfaces of a substantially X shape on which the rectangular prisms are stuck together. The dielectric multilayer film formed on one interface of the substantially X shape reflects red light and transmits green light. The dielectric multilayer film formed on the other interface reflects blue light and transmits the green light. The red light and the blue light are bent by the dielectric multilayer films and aligned with a traveling direction of the green light, whereby the three color lights are combined.

Although detailed explanation is omitted, the projecting unit 90 includes a plurality of lenses and a focusing mechanism. The projecting unit 90 projects the light combined by the cross dichroic prism 80 as a projected image. A direction in which the projecting unit 90 projects light is represented as projecting direction.

The heat radiating units 100R, 100G, and 100B are arranged on sides other than sides on which the light source units 50R, 50G, and 50B respectively emit lights. The heat radiating units 100R, 100G, and 1003 radiate heats emitted from the light emitting units 52R, 52G, and 52B in the light source units 50R, 50G, and 50B. The heat radiating units 100R, 100G, and 100B function as so-called heat sinks. The heat radiating units 100R, 100G, and 100B are formed of a member with high thermal conductivity such as aluminum.

Figure 2A:
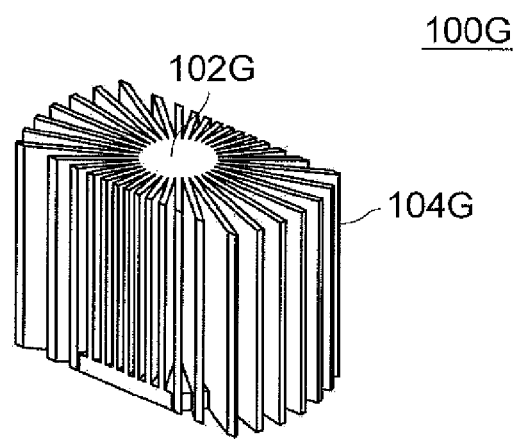
FIG. 2A is a perspective view of a heat radiating unit in the first embodiment.
Figure 2B:
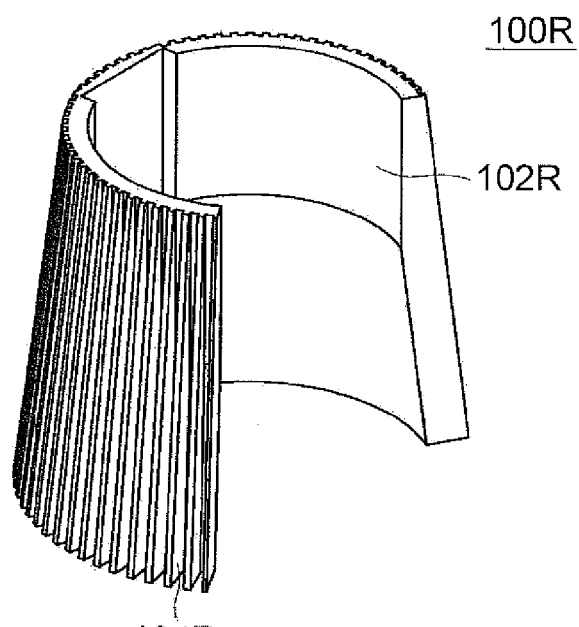
FIG. 2B is a perspective view of the heat radiating unit in the first embodiment.
Figure 2C:
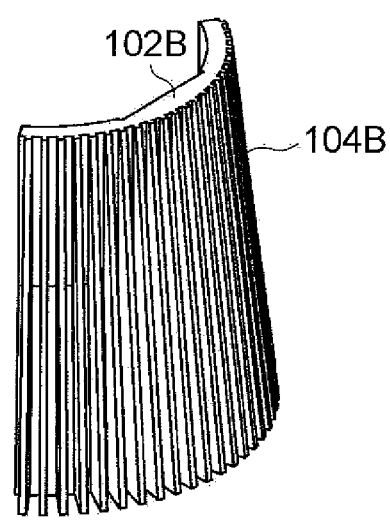
FIG. 2C is a perspective view of the heat radiating unit in the first embodiment.

FIGS. 2A to 2C are perspective views of the heat radiating units 100R, 100G, and 100B. Specifically, FIG. 2A is a perspective view of the heat radiating unit 100G. FIG. 2B is a perspective view of the heat radiating unit 100R. FIG. 2C is a perspective view of the heat radiating unit 100B.

As shown in FIG. 10 and FIGS. 2A to 2C, the heat radiating units 100R, 100C, and 100B have different sizes and shapes according to thermal characteristics and arrangement positions of the light source units 50R, 50G, and 50B respectively corresponding to the heat radiating units 100R, 100G, and 100B. The heat radiating units 100R, 100G, and 100B are arranged not to conduct heat to one another. It is possible to adopt various arrangements in which the heat radiating units 100R, 100G, and 1003 are non-heat conductive to one another, for example, an arrangement in which the heat radiating units 100R, 100G, and 100B are not in contact with one another and an arrangement in which non-heat conduction members are interposed among the heat radiating units 100R, 100G, and 100B.

As shown in FIGS. 1B and 1C, the heat radiating unit 100G corresponding to the light source unit 50G is arranged in a position close to the connecting unit 10, more specifically, between the light source unit 50G and the cooling unit 30. The heat radiating unit 100G includes, as shown in FIG. 2A, a columnar center section 102G and a plurality of fins 104G radially extending from the center section 102G.

As shown in FIGS. 1B and 1C, the heat radiating units 100R and 100B corresponding to the light source units 50R and 50B are respectively arranged in the light source units 50R and 503 on the opposite side of the cross dichroic prism 80 in positions on a side surface side, more specifically, in a direction substantially orthogonal to the projecting direction.

As shown in FIGS. 23 and 2C, the heat radiating units 100R and 1003 have a shape in which a plurality of fins 104R and 104B radially extend from base sections 102R and 102B having a conical partial outer surface shape.

The heat radiating unit 100R is formed larger than the heat radiating unit 100B. This is because the light source unit 50R needs to be cooled more than the light source unit 50B because of thermal characteristics of the light source unit 50R. The size and the shape of the heat radiating unit can be variously set according to thermal characteristics and an arrangement position of a light source unit in use.

The circuit board 110 is mounted with an electronic component for controlling the operation of the projector 1000, an electronic component for driving the projector 1000, and the like.

As shown in FIGS. 1A to 1C, the cover 120 has an external shape obtained by deleting a pointed end portion from a conical shape and is formed to cover the optical engine unit 40 from an end on the projecting direction side of the cooling unit 30. The cover 120 is arranged such that a larger side of the conical shape is located on the projecting direction side. An opening section 121 is provided at an end in the projecting direction. A space through which the air led in from the opening section 121 can circulate is provided on the inside of the cover 120. That is a sectional shape of the cover 120 on a plane orthogonal to the projecting direction is a sectional shape in which an opening area decreases from the opening section 121 side toward the cooling unit 30 side.

Figure 3:
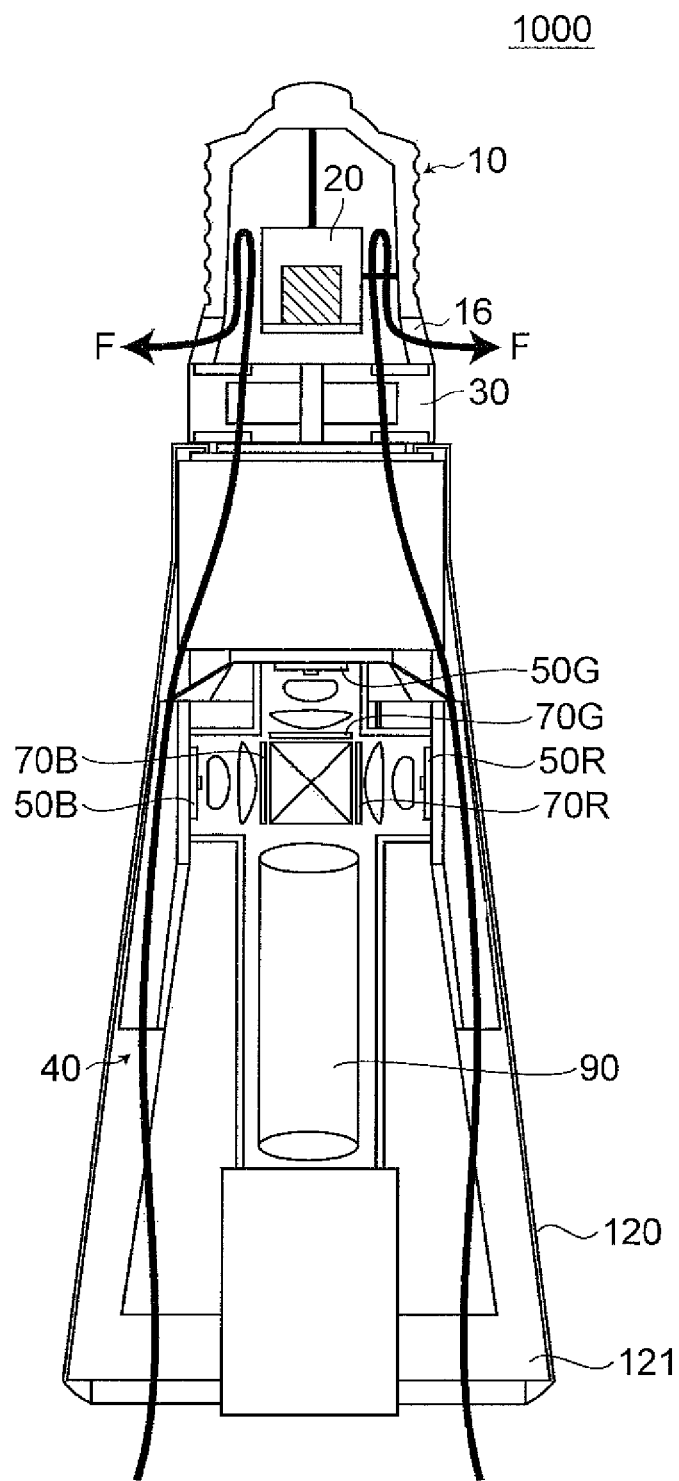
FIG. 3 is a schematic diagram for explaining a flow of the air by a cooling unit of the projector according to the first embodiment.

FIG. 3 is a schematic diagram for explaining a flow of the air by the cooling unit 30 of the projector 1000 according to this embodiment. Curved line arrows indicated by sign F in FIG. 3 represent schematic flows of the air.

As shown in FIG. 3, the cooling unit 30 leads the air from the opening section 121 and cools the optical engine unit 40 including the light source units 50R, 500, and 50B and the light modulating units 70R, 70G, and 70B. Further, the cooling unit 30 leads the air, which has cooled the optical engine unit 40, to the connecting unit 10 side to cool the power supply unit 20 and discharges the air from the communication ports 16. In this way, the cooling unit 30 forms a flow of the air from the optical engine unit 40 side to the connecting unit 10 side, i.e., to the power supply unit 20 side arranged in the connecting unit 10. Therefore, the air on a side on which the projector 1000 projects a projected image cools the optical engine unit 40 and, then, passes through the cooling unit 30, further cools the power supply unit 20, and is discharged to the outside from the communication ports 16.

The air led in from the opening section 121 is caused to pass near the optical engine unit 40 by the cover 120. As explained above, the cover 120 has a sectional shape in which an opening area decreases from the projecting direction side toward the cooling unit 30 side. Therefore, the flow velocity of the air led in from the opening section 121 increases toward the cooling unit 30 side.

In this embodiment, the cover 120 is configured to cover the entire optical engine unit 40. However, the cover 120 is not limited to this configuration and may be configured to cover a part of the optical engine unit 40. Although not shown in the figure, in order to prevent foreign matters such as dust from intruding into the optical engine unit 40 from the opening section 121, the projector 1000 may be configured such that a dustproof filter is arranged at least in an area in the opening section 121 where the dustproof filter does not block light projected from the projecting unit 90.

In some bulb sockets, a socket cover equivalent to a shade of a luminaire is provided. The projector 1000 in this embodiment is configured to be capable of being connected to a bulb socket 5, in which the socket cover is provided, and used.

Figure 4A:
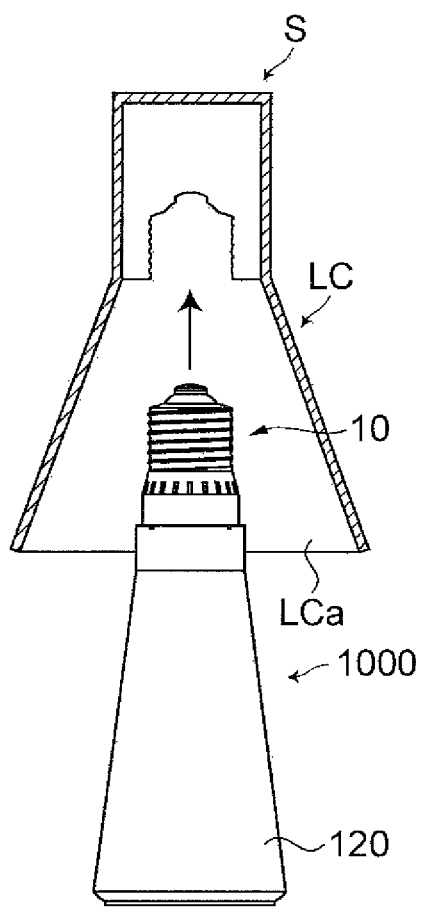
FIG. 4A is a schematic diagram showing the projector and a bulb socket provided with a socket cover in the first embodiment.
Figure 4B:
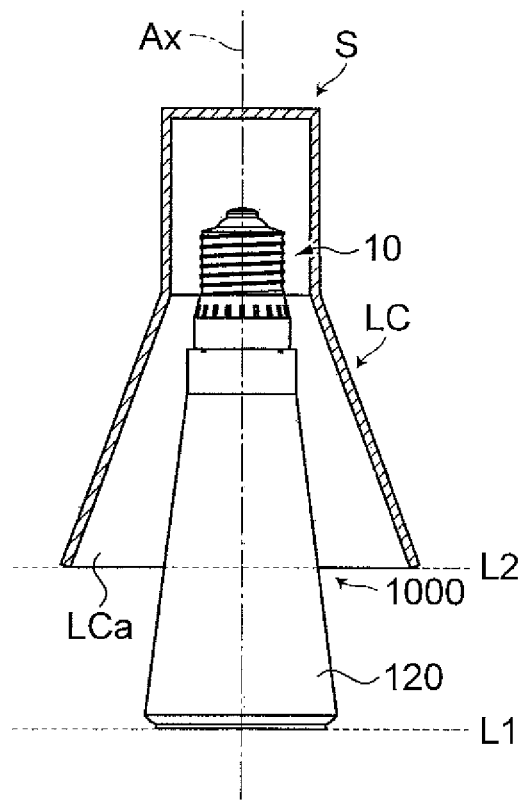
FIG. 4B is a diagram showing a state in which the projector is attached to the bulb socket in the first embodiment.

FIGS. 4A and 4B are schematic diagrams showing the projector 1000 and the bulb socket S provided with a socket cover LC. Specifically, FIG. 4A is a diagram showing a state before the projector 1000 is attached to the bulb socket S. FIG. 4B is a diagram showing a state in which the projector 1000 is attached to the bulb socket S. In FIGS. 4A and 4B, the bulb socket S and the socket cover LC are shown in sectional views.

As shown in FIGS. 4A and 4B, the socket cover LC has a shape expanding downward from the lower end of the bulb socket S. An opening section LCa is provided at the lower end of the socket cover LC.

The projector 1000 is inserted from the opening section LCa. The connecting unit 10 is connected to the bulb socket S.

The cover 120 is arranged such that the end in the projecting direction thereof projects further to the projecting direction side than the end on the projecting direction side of the socket cover LC. That is, as shown in FIG. 4B, when an axis in the center of the connecting unit 10 is represented as center axis Ax, an imaginary line perpendicular to the center axis Ax and in contact with the end on the projecting direction side of the cover 120 is represented as first imaginary line L1, and an imaginary line perpendicular to the center axis Ax and in contact with the end on the projecting direction side of the socket cover LC is represented as second imaginary line L2, a point of contact of the first imaginary line L1 and the center axis Ax is located further on the projecting direction side than a point of contact of the second imaginary line L2 and the center axis Ax.

A flow of the air led in from the opening section 121 is explained in comparison with a flow of the air in a projector 1001 not including the cover 120.

Figure 5:
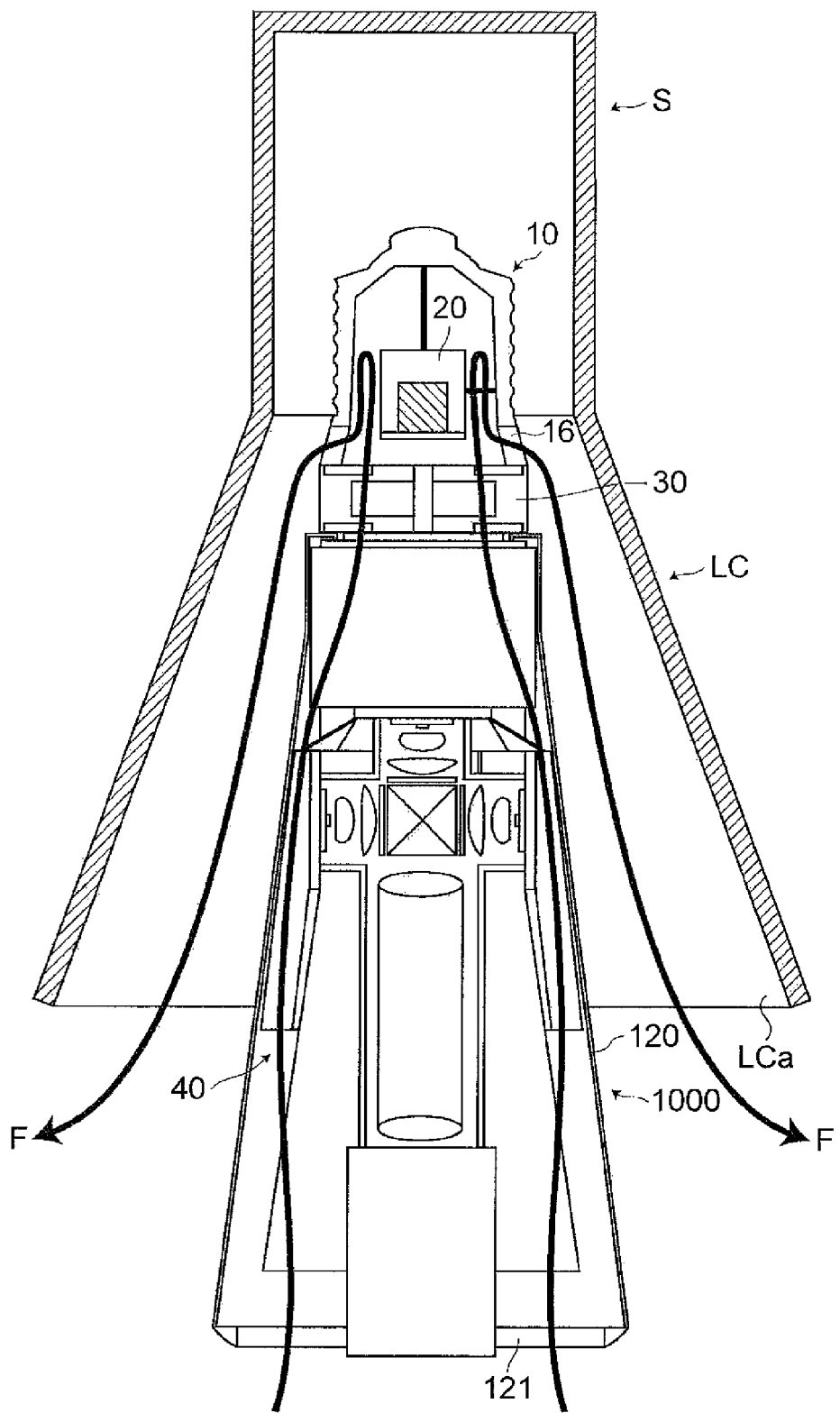
FIG. 5 is a schematic diagram for explaining a flow of the air by the cooling unit of the projector attached to the bulb socket in the first embodiment.
Figure 6:
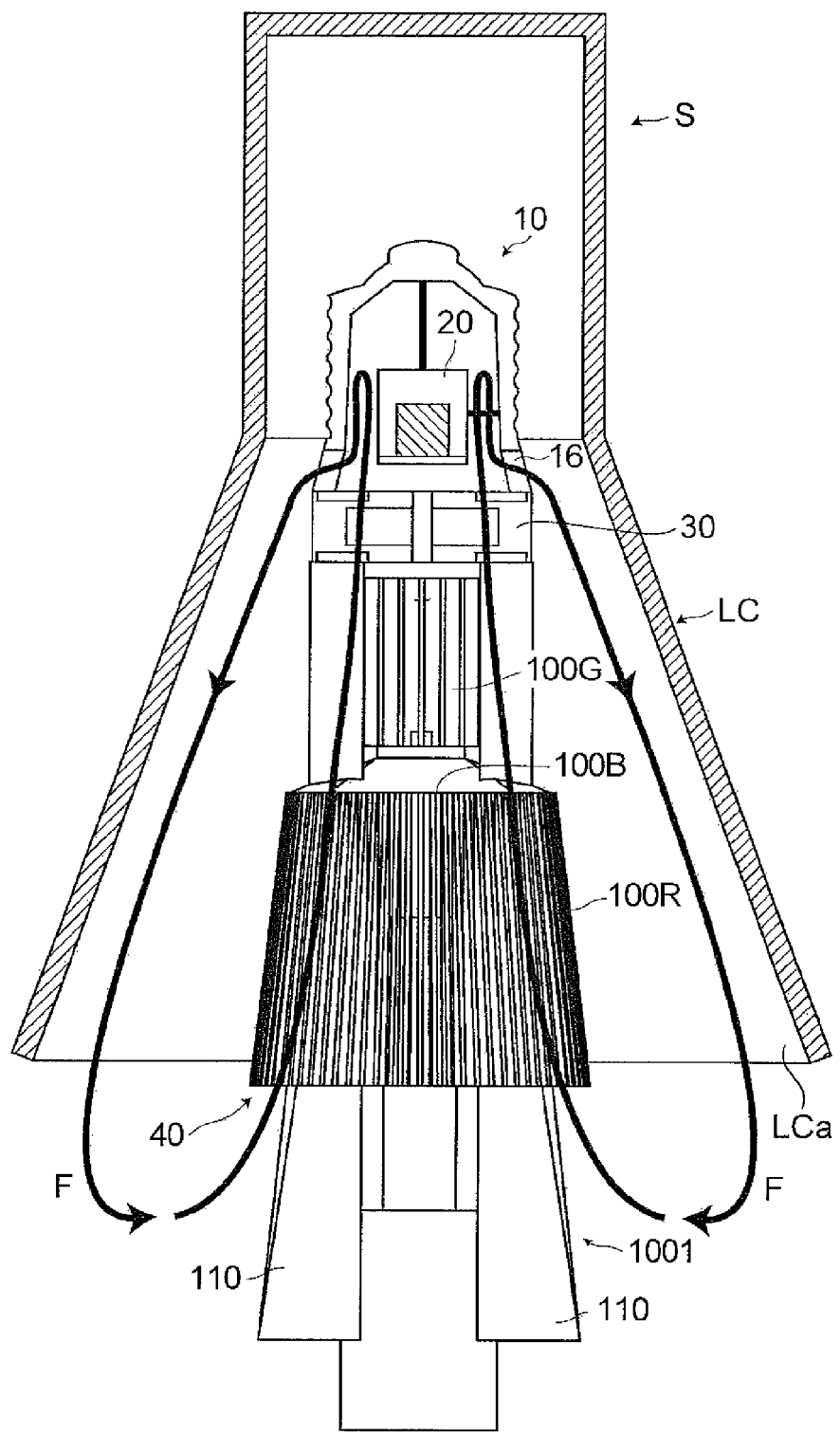
FIG. 6 is a schematic diagram for explaining a flow of the air by the cooling unit in a state in which a projector not including a cover is attached to the bulb socket.

FIG. 5 is a schematic diagram for explaining a flow of the air by the cooling unit 30 in the projector 1000 attached to the bulb socket S provided with the socket cover LC. FIG. 6 is a schematic diagram for explaining a flow of the air by the cooling unit 30 in a state in which the projector 1001 not including the cover 120 is attached to the bulb socket S provided with the socket cover LC. In FIGS. 5 and 6, curved line arrows indicated by sign F represent schematic flows of the air.

In the projector 1001 not including the cover 120, as shown in FIG. 6, the air cools the optical engine unit 40 and the power supply unit 20 in the connecting unit 10 and is discharged from the communication ports 16. A part of the air is discharged from the opening section Lca. However, another part of the air is absorbed by the cooling unit 30 again and circulates through the optical engine unit 40 and the power supply unit 20.

On the other hand, in the projector 1000 in this embodiment, as shown in FIG. 5, the air is led in from the opening section 121, cools the optical engine unit 40 and the power supply unit 20 in the connecting unit 10, and is discharged to the outside of the projector 1000 from the communication ports 16. Then, the air circulates between the cover 120 and the socket cover LC and is discharged from the opening section LCa on the outside of the cover 120. That is, in the projector 1000 in this embodiment, the air to be used for cooling and the air used for cooling and warmed circulate separately from each other.

Effects of the projector 1000 according to this embodiment are explained.

The projector 1000 according to this embodiment includes the connecting unit 10 connectable to the bulb socket S. Therefore, it is possible to easily attach and use the projector 1000 in any place where the bulb socket S is set.

In the projector 1000 according to this embodiment, the connecting unit 10 is connectable to the widely-used screw-type bulb socket S. Therefore, it is possible to increase occasions when the projector 1000 can be used.

The projector 1000 according to this embodiment includes the cooling unit 30 arranged between the connecting unit 10 and the optical engine unit 40 and configured to circulate the air to cool the power supply unit 20 and the optical engine unit 40. Therefore, it is possible to configure a compact cooling route and contribute to a reduction in size of the projector 1000.

Further, it is possible to cool, with one cooling unit, the main components to be heated such as the power supply unit 20 and the light source units 50R, 50G, and 503. Therefore, it is possible to reduce costs of the projector.

In the projector 1000 according to this embodiment, the connecting unit 10 and the optical engine unit 40 are arranged in the positions opposed across the cooling unit 30. Therefore, it is possible to cool the main components using a cooling unit having a simple configuration.

In the projector 1000 according to this embodiment, the cooling unit 30 forms a flow of the air from the optical engine unit 40 side to the connecting unit 10 side. Therefore, it is possible to first cool the light source units 50R, 50G, and 50B and the light modulating units 70R, 70G, and 70B, for which necessity of cooling is high from the viewpoint of a heat value and a heat resistant temperature, and secure operation stability of the projector.

In the projector 1000 according to this embodiment, a flow of the air from the side where the projector 1000 projects an image to the side of the bulb socket can be formed. Therefore, it is possible to suppress a projected image from being swayed by the warmed air.

The projector 1000 according to this embodiment includes the heat radiating units 100R, 100G, and 100B. Therefore, it is possible to efficiently cool the light source unit 50R, 50G, and 50B and greatly reduce heat conducted from the light source units 50R, 50G, and SOB to the other components (e.g., the light modulating units 70R, 70G, and 70B).

In the projector 1000 according to this embodiment, the optical engine unit 40 includes the plurality of light source units 50R, 50G, and 50B. Therefore, it is possible to project a multicolor projected image without separating light emitted from one light source unit, which emits white light, into a plurality of color lights. Further, a configuration for separating color light into a plurality of color lights is unnecessary. Therefore, it is possible to contribute to a reduction in size of the projector 1000.

In the projector 1000 according to this embodiment, the plurality of heat radiating units 100R, 100G, and 100B are provided to individually correspond to the plurality of light source units 50R, 50G, and 50B. Therefore, it is possible to perform efficient cooling of the light source units. Further, the heat radiating units 100R, 100G, and 100B are arranged not to conduct heat to one another. Therefore, it is possible to perform cooling suitable for the respective light source units 50R, 50G, and 50B.

In the projector 1000 according to this embodiment, the light source unit 50G is arranged in the direction opposite to the projecting direction with respect to the cross dichroic prism 80. The light source units 50R, 50G, and 50B are arranged in the direction substantially orthogonal to the projecting direction with respect to the cross dichroic prism 80. The heat radiating unit 100G is arranged between the light source unit 50G and the cooling unit 30. The heat radiating units 100R and 100B are arranged in the direction substantially orthogonal to the projecting direction with respect to the light source units 50R and 50B. Consequently, in the projector 1000 including the three light source units 50R, 50G, and 50B, it is possible to arrange the heat radiating units 100R, 100G, and 100B in appropriate positions and efficiently cool the light source units 50R, 50G, and 50B.

The projector 1000 according to this embodiment includes the cover 120. Therefore, it is possible to cause the air to pass near the optical engine unit 40 and it is possible to improve cooling efficiency. The shape of the cover 120 is formed such that the opening area decreases from the projecting direction side (the lead-in side of the air) to the cooling unit 30 side. Therefore, it is possible to increase the speed of a flow of the air toward the cooling unit 30 side and further improve the cooling efficiency.

Even when the projector 1000 is connected to the bulb socket S provided with the socket cover LC, the warmed air, which has cooled the inside of the projector 1000, is suppressed by the cover 120 from being led into the projector 1000 again. Therefore, it is possible to perform efficient cooling of the inside of the projector 1000.

Second Embodiment

A projector 1002 according to a second embodiment basically has a configuration same as the configuration of the projector 1000 according to the first embodiment. However, the projector 1002 includes a cooling unit 32 having a configuration different from the configuration of the cooling unit 30 in the projector 1000 according to the first embodiment.

Figure 7:
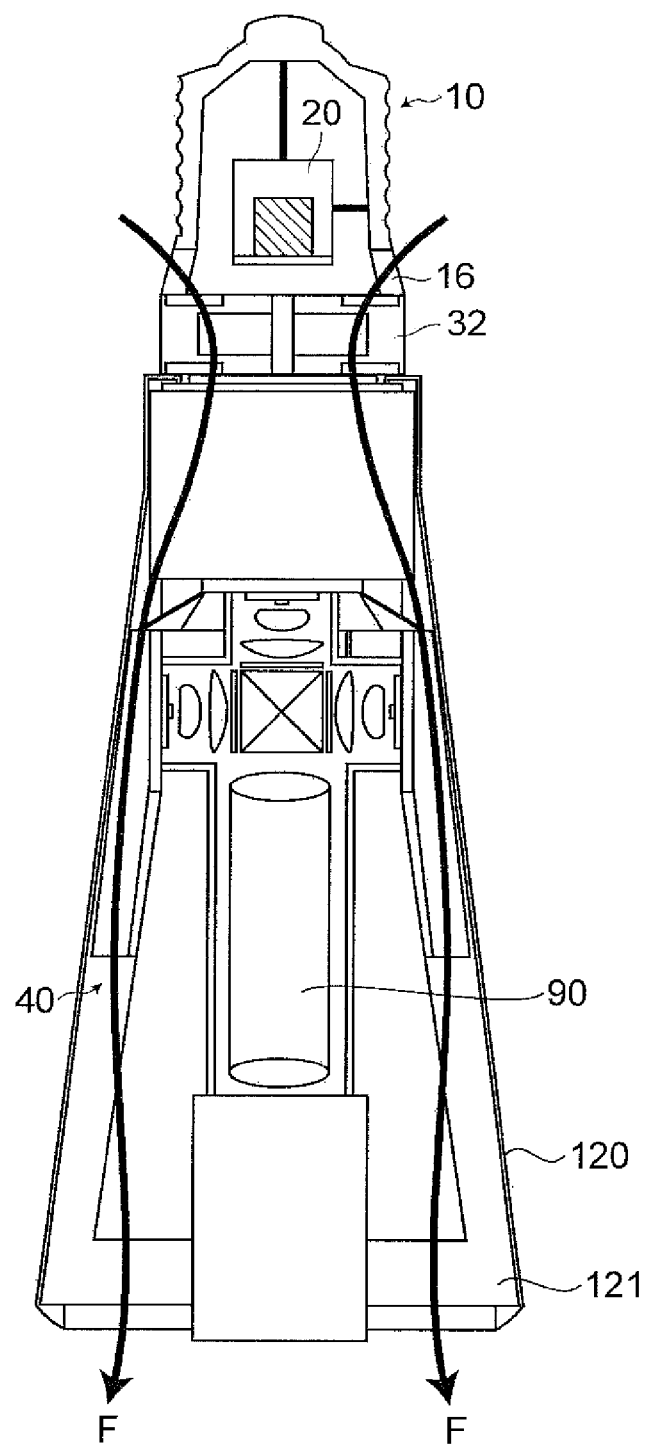
FIG. 7 is a schematic diagram for explaining a projector according to a second embodiment.

FIG. 7 is a schematic diagram for explaining the projector 1002 according to the second embodiment. In FIG. 7, curved line arrows indicated by sign F represent schematic flows of the air.

As shown in FIG. 7, the cooling unit 32 in the projector 1002 according to this embodiment is configured to form a flow of the air from the connecting unit 10 side to the optical engine unit 40 side.

That is, the cooling unit 32 forms the flow of the air in a direction opposite to the direction of the flow of the air formed by the cooling unit 30 in the first embodiment. Specifically, the air outside the projector 1002 is led in from the communication ports 16 by the cooling unit 32. After cooling the inside of the projector 1002, the led-in air is discharged from the opening section 121. For example, when it is necessary to preferentially cool the connecting unit 10 and the power supply unit 20 arranged in the connecting unit 10 or when the heat value of the connecting unit 10 and the power supply unit 20 is small and the optical engine unit 40 can be sufficiently cooled, it is possible to adopt the configuration of the cooling unit 32 in this embodiment.

Although not shown in the figure, in order to prevent the air discharged from the opening section 121 from entering the area of light projected from the projecting unit 90, it is possible to provide, in the opening section 121, a current plate for changing a flow of the air or provide the opening section 121 on the side surface of the cover 120. In this embodiment, it is preferable that a dustproof filter is arranged in the communication ports 16.

As explained above, in the projector 1002 according to this embodiment, the configuration of the cooing unit 32 is different from the configuration of the cooling unit 30 of the projector 1000 according to the first embodiment. However, the cooling unit 32 is arranged between the connecting unit 10 and the optical engine unit 40 and cools the power supply unit 20 and the optical engine unit 40. Therefore, as in the projector 1000 according to the first embodiment, it is possible to configure a compact cooling route and contribute to a reduction in size of the projector 1002.

The projector 1002 according to this embodiment has a configuration same as the configuration of the projector 1000 according to the first embodiment except the configuration of the cooling unit 32. Therefore, the projector 1002 has effects substantially the same as the effects of the projector 1000 according to the first embodiment.

Third Embodiment

A projector 1004 according to a third embodiment includes an extension member 124 not included in the projector 1000 according to the first embodiment and includes a cover 122 formed to allow the extension member 124 to be attached and detached.

FIGS. 8A to 8D are schematic diagrams for explaining the projector 1004 according to this embodiment. Specifically, FIG. 8A is a sectional view of the projector 1004 in a state in which the extension member 124 is not attached. FIG. 8B is a sectional view of the projector 1004 in a state in which the extension member 124 is attached. FIG. 8C is a sectional view of the extension member 124. FIG. 8D is a perspective view of the extension member 124.

The cover 122 has a configuration same as the configuration of the cover 120 in the first embodiment. However, the cover 122 is different from the cover 120 in that the cover 122 includes, at an end on an opening section 1221 side, a fixing section 123 configured to engage with the extension member 124.

The fixing section 123 includes a protrusion-like convex portion in an inner circumferential section. The extension member 124 engages with the convex portion to be attached to the cover 122.

As shown in FIGS. 8C and 8D, the extension member 124 has an external shape obtained by cutting off a pointed end portion from a conical shape. The extension member 124 is formed such that the outer surface thereof extends along the outer surface of the cover 122 in a state in which the extension member 124 is attached to the cover 122. The extension member 124 is formed hollow not to hinder projection of a projected image. The extension member 124 includes an opening section 126 located on the opening section 1221 side of the cover 122 and an opening section 127 on a distal end side in a projecting direction of the projector 1004.

The extension member 124 includes, on the outer surface on the opening section 126 side where an opening area is small, an engaging section 125 configured to engage with the convex portion of the fixing section 123 of the cover 122. The engaging section 125 is formed in a concave shape in which the convex portion of the fixing section 123 is fit. The extension member 124 can be attached to the cover 122 by engaging the convex portion of the fixing section 123 and the engaging section 125 having the concave shape. When the extension member 124 is attached to the cover 122, the length in the projecting direction of the projector 1004 is extended.

When a force is applied in the projecting direction, the convex portion of the fixing section 123 and the engaging section 125 are disengaged and the extension member 124 is detached from the cover 122. In this way, the extension member 124 is detachably attached to the cover 122.

A structure for detachably attaching the extension member 124 to the cover 122 is not limited to the structure explained above. Various methods for attachment can be used. For example, a method can be used in which a thread is provided in the cover 122 and the extension member 124 and one thread is screwed into the other.

As explained above, the projector 1004 according to this embodiment is different from the projector 1000 according to the first embodiment in that the extension member 124 can be detachably attached. However, since the projector 1004 includes a cooling mechanism formed by the cooling unit 30 and the cover 122, it is possible to improve cooling efficiency for the projector 1004 as in the projector 1000 according to the first embodiment.

The projector 1004 according to this embodiment has a mounted state in which the extension member 124 is attached to the cover 122 and an unmounted state in which the extension member 124 is not attached to the cover 122. Consequently, it is possible to adjust the projector 1004 to an environment of use (e.g., the size of a socket cover) and select, as an interior or the like, the projector 1004 in more suitable one of the mounted state and the unmounted state according to a taste of a user. Therefore, it is possible to perform efficient cooling and improvement of the appearance of the projector 1004.

The projector 1004 according to this embodiment includes one extension member 124. However, the projector 1004 may include a plurality of extension members that are detachably attachable to the cover 122 stepwise. The projector 1004 according to this embodiment has the configuration same as the configuration of the projector 1000 according to the first embodiment except that the extension member 124 is detachably attachable to the cover 122. Therefore, the projector 1004 according to this embodiment has effects same as the effects of the projector 1000 according to the first embodiment.

Fourth Embodiment

A projector 1006 according to a fourth embodiment includes a projector cover 130 not included in the projector 1000 according to the first embodiment. The projector cover 130 is formed to cover at least a part of the cover 120.

Figure 9C:
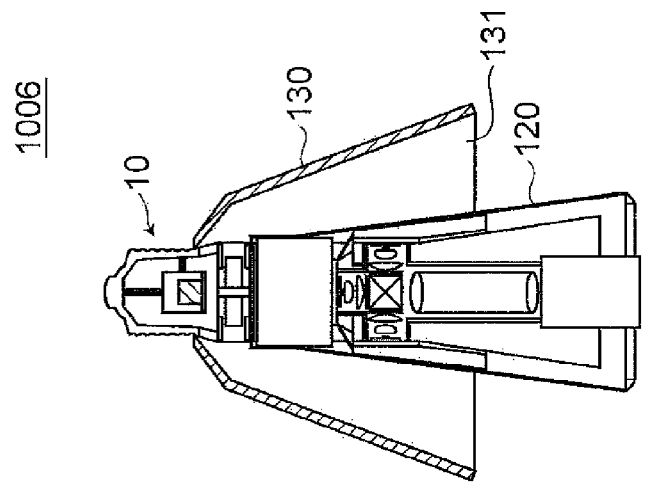
FIG. 9C is a sectional view of the projector according to the fourth embodiment.
Figure 9B:
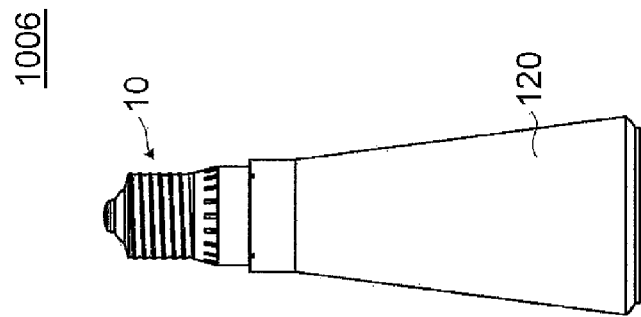
FIG. 9B is a diagram of a state in which a projector cover of the projector according to the fourth embodiment is removed.
Figure 9A:
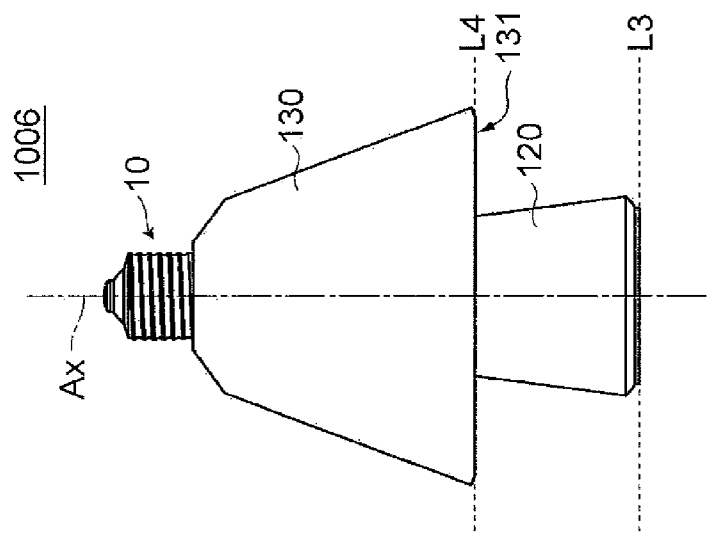
FIG. 9A is a front view of a projector according to a fourth embodiment.

FIGS. 9A to 9C are schematic diagrams for explaining the projector 1006 according to this embodiment. FIG. 9A is a front view of the projector 1006. FIG. 9B is a front view of the projector 1006 in a state in which the projector cover 130 is removed. FIG. 9C is a sectional view of the projector 1006.

As shown in FIGS. 9A to 9C, the projector cover 130 is formed to expose the connecting unit 10, include an opening section 131 at an end on a projecting direction side, and cover the connecting unit 10 side of the cover 120. The projector cover 130 has a shape expanding downward from the lower end of the connecting unit 10. A hole through which the connecting unit 10 is inserted is formed at the upper end of the projector cover 130. The projector cover 130 has a shape in which the end on the projecting direction side is located further on the connecting unit 10 side than the end on the projecting direction side of the cover 120. That is, as shown in FIG. 9A, when an imaginary line perpendicular to the center axis Ax and in contact with the end on the projecting direction side of the cover 120 is represented as third imaginary line L3 and an imaginary line perpendicular to the center axis Ax and in contact with the end on the projecting direction side of the projector cover 130 is represented as fourth imaginary line L4, a point of contact of the fourth imaginary line L4 and the center axis Ax is located further on the connecting unit 10 side than a point of contact of the third imaginary line L3 and the center axis Ax.

Figure 10:
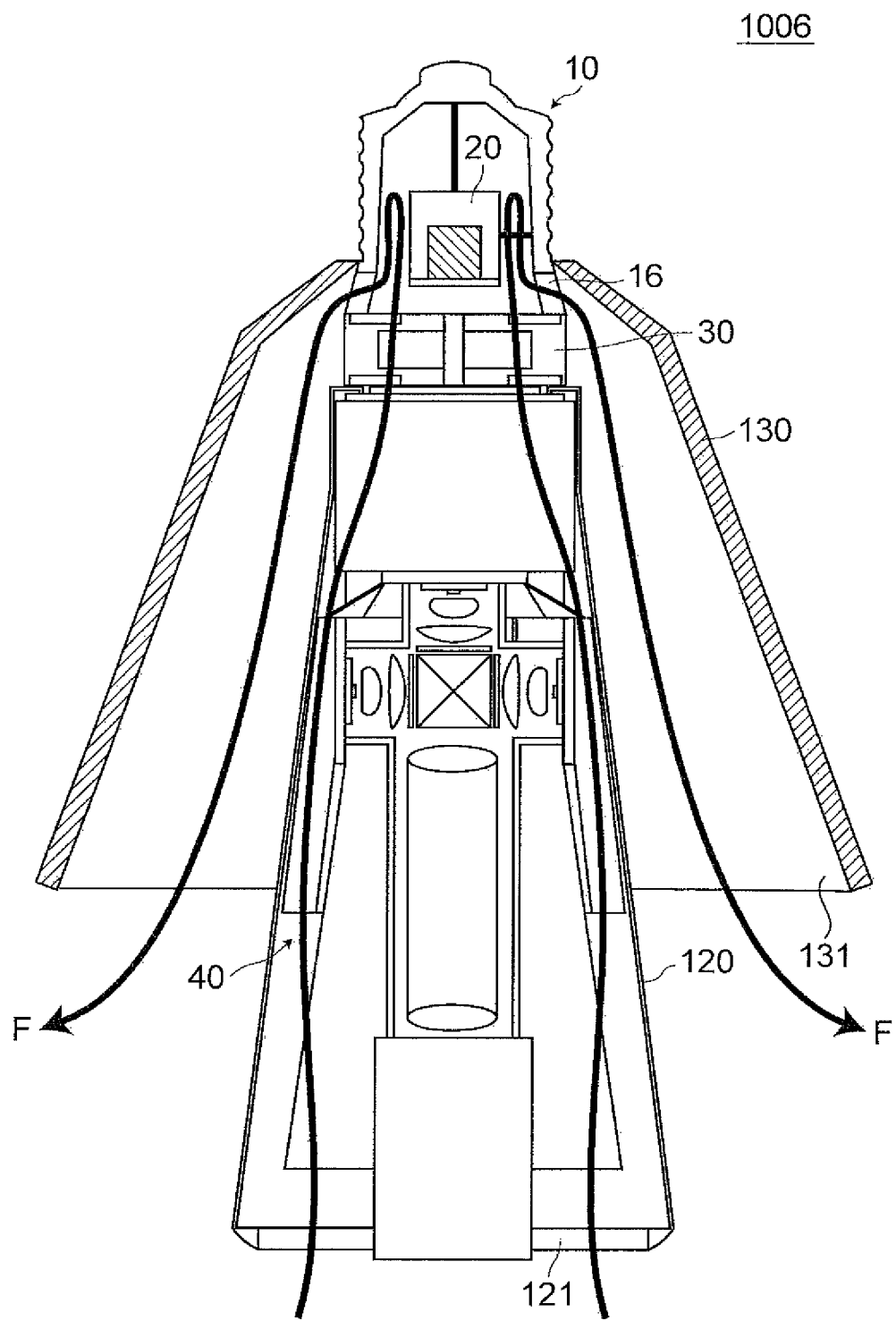
FIG. 10 is a schematic diagram for explaining a flow of the air by a cooling unit of the projector according to the fourth embodiment.

FIG. 10 is a schematic diagram for explaining a flow of the air by the cooling unit 30 of the projector 1006 according to this embodiment.

As shown in FIG. 10, the air cools the optical engine unit 40 and the power supply unit 20 in the connecting unit 10 and is discharged from the communication ports 16. Then, as in the projector 1000 connected to the bulb socket S provided with the socket cover LC explained in the first embodiment (see FIG. 5), the air circulates between the cover 120 and the projector cover 130 and is discharged from the opening section 131 on the outer side of the cover 120. That is, in the projector 1006, the air to be used for cooling and the air used for cooling and warmed circulate separately.

The projector 1006 according to this embodiment includes a cooling mechanism formed by the cooling unit 30, the cover 120, and the projector cover 130. Therefore, it is possible to separate the air to be used for cooling and the air used for cooling and warmed and improve cooling efficiency for the components in the projector 1006.

In the projector 1006 according to this embodiment, the projector 130 has the shape in which the end on the projecting direction side is located further on the connecting unit 10 side than the end on the projecting direction side of the cover 120. Therefore, it is possible to suppress the warmed air circulating between the cover 120 and the projector cover 130 from being led into the cover 120 again and further improve the cooling efficiency for the components in the projector 1006.

The projector 1006 according to this embodiment includes the projector cover 130. Therefore, it is more likely that the projector 1006 is observed as an interior by a user. Therefore, even when the projector 1006 is attached to a bulb socket S not provided with the socket cover LC, it is possible to improve the appearance characteristics of the projector 1006.

The projector 1006 according to this embodiment has a configuration same as the configuration of the projector 1000 according to the first embodiment except that the projector 1006 includes the projector cover 130. Therefore, the projector 1006 has effects same as the effects of the projector 1000 according to the first embodiment.

Modifications

The invention is explained above on the basis of the embodiments. However, the invention is not limited to the embodiments. It is possible to carry out the invention in various forms without departing from the spirit of the invention. For example, modifications explained below are possible.

The shapes of the components described in the embodiments are examples only. The shapes can be changed within a range in which the effects of the invention are not spoiled.

In the embodiments, the power supply unit 20 is configured such that a part of the filter circuit and the like is arranged on the inside of the connecting unit 10. However, the invention is not limited to this. Circuits configuring the power supply unit 20 other than the filter circuit may be arranged in the connecting unit 10. A cable included in the power supply unit 20 and connected to the connecting unit 10 may be arranged on the inside of the connecting unit 10. Members configuring the power supply unit 20 other than the cable may be arranged in places other than the inside of the connecting unit 10. The entire power supply unit 20 may be arranged in the connecting unit 10.

In the embodiments, the light modulating devices of the liquid crystal type are used as the light modulating units 70R, 70G, and 70B. However, the invention is not limited to this. For example, light modulating devices of a micro mirror type may be used as the light modulating units 70R, 70G, and 70B. As the light modulating devices of the micro mirror type, for example, DMDs (digital micro mirror devices) can be used.

In the embodiments, the projector including the three light modulating units 70R, 70G, and 70B is explained as the example. However, the invention is not limited to this. The invention can also be applied to a projector including one, two, or four or more light modulating units.

In the embodiments, the light source units 50R, 50G, and S0B include the light emitting units such as light emitting diodes (LEDs). However, other light sources such as metal halide lamps, high pressure mercury lamps, and extra-high pressure mercury lamps may be used.

The projector 1000 according to the first embodiment includes the cover 120. However, the projector 1000 does not have to include the cover 120.

CROSS REFERENCE TO RELATED APPLICATIONS

This application claims priority to Japanese Patent Application No. 2012-252965 and No. 2012-252966 filed on Nov. 19, 2012, the entire contents of which are incorporated by reference herein.

What is claimed is:

1. A projector comprising:
an optical engine unit including a light source unit configured to emit light, a light modulating unit configured to modulate, according to image information, the light emitted from the light source unit, and a projecting unit configured to project the light modulated by the light modulating unit;
a connecting unit connectable to a bulb socket;
a power supply unit configured to supply electric power received from the connecting unit to the optical engine unit; and
a cooling unit arranged between the connecting unit and the optical engine unit, the cooling unit including a fan configured to circulate the air to cool the power supply unit and the optical engine unit,
wherein the cooling unit forms a flow of air from a side of the optical engine unit to a side of the connecting unit,
the optical engine unit includes:
a plurality of the light source units; and
a plurality of heat radiating units individually corresponding to the plurality of light source units,
the plurality of light source units are first to third source units, the optical engine unit includes a light combining unit configured to combine lights emitted from the first to third light source units and emit combined light, the first light source unit is arranged in a direction opposite to a projecting direction, in which the projecting unit projects light, with respect to the light combining unit, the second and third light source units are arranged in a direction substantially orthogonal to the projecting direction with respect to the light combining unit, the heat radiating unit corresponding to the first light source unit is arranged between the first light source unit and the cooling unit, the heat radiating units corresponding to the second and third light source units are arranged in directions substantially orthogonal to the projecting direction with respect to the second and third light source units, the heat radiating units corresponding to the second and third light source units having different sizes, and the heat radiating units corresponding to the second and third light source units are respectively arranged on opposite sides of the light combining unit in a direction substantially orthogonal to the projecting direction.

2. The projector according to claim 1, wherein at least a part of the power supply unit is arranged on an inside of the connecting unit.

3. The projector according to claim 1, wherein the connecting unit and the optical engine unit are respectively arranged in positions opposed across the cooling unit.

4. The projector according to claim 1, wherein the connecting unit is connectable to a screw-type bulb socket.

5. The projector according to claim 1, further comprising:
a communication port configured to communicate an outside and an inside of the projector; and
a cover including an opening section at an end on the projecting direction side where the projecting unit projects light and configured to cover at least a part of the optical engine unit, wherein
the cooling unit leads in the air outside the projector from one of the communication port and the opening section and leads the led-in air to the other.

6. The projector according to claim 5, wherein the communication port is arranged on an opposite side of the optical engine unit with respect to the cooling unit.

7. The projector according to claim 5, wherein the cooling unit leads in the air from the opening section and leads the led-in air to the communication port.

8. The projector according to claim 7, wherein
the connecting unit and the optical engine unit are respectively arranged in positions opposed across the cooling unit, and
a sectional shape of the cover on a plane orthogonal to the projecting direction is a sectional shape in which an opening area decreases from the opening section side toward the cooling unit side.

9. The projector according to claim 5, wherein
the cover covers the heat radiating unit and extends in the projecting direction.

10. The projector according to claim 5, wherein
the cover covers the heat radiating unit and at least a part of the projecting unit and extends in the projecting direction.

11. The projector according to claim 5, further comprising an extension member extending from an end on the opening section side of the cover in the projecting direction and detachably attached to the end.

12. The projector according to claim 5, further comprising a dustproof filter arranged at least in an area of the opening section of the cover where the light projected from the projecting unit is not blocked.

13. A projector comprising:
an optical engine unit including a light source unit configured to emit light, a light modulating unit configured to modulate, according to image information, the light emitted from the light source unit, and a projecting unit configured to project the light modulated by the light modulating unit;
a connecting unit connectable to a bulb socket;
a power supply unit configured to supply electric power received from the connecting unit to the optical engine unit;
a cooling unit arranged between the connecting unit and the optical engine unit, the cooling unit including a fan configured to circulate the air to cool the power supply unit and the optical engine unit;
a cover including an opening section at an end on a projecting direction side where the projecting unit projects light and configured to cover at least a part of the optical engine unit; and
a projector cover including an opening section at an end on the projecting direction side and configured to cover at least a part of the cover, wherein
the projector cover has a shape in which the end on the projecting direction side is located further on the connecting unit side than the end on the projecting direction side of the cover, and
wherein the cooling unit forms a flow of air from a side of the optical engine unit to a side of the connecting unit,
the optical engine unit includes:
a plurality of the light source units; and
a plurality of heat radiating units individually corresponding to the plurality of light source units,
the plurality of light source units are first to third light source units,
the optical engine unit includes a light combining unit configured to combine lights emitted from the first to third light source units and emit combined light,
the first light source unit is arranged in a direction opposite to a projecting direction, in which the projecting unit projects light, with respect to the light combining unit,
the second and third light source units are arranged in a direction substantially orthogonal to the projecting direction with respect to the light combining unit,
the heat radiating unit corresponding to the first light source unit is arranged between the first light source unit and the cooling unit,
the heat radiating units corresponding to the second and third light source units are arranged in directions substantially orthogonal to the projecting direction with respect to the second and third light source units,
the heat radiating units corresponding to the second and third light source units having different sizes, and
the heat radiating units corresponding to the second and third light source units are respectively arranged on opposite sides of the light combining unit in a direction substantially orthogonal to the projecting direction.

* * * * *